United States Patent [19]

Suga et al.

[11] Patent Number: 4,715,716

[45] Date of Patent: Dec. 29, 1987

[54] RHOMBIC-SHAPED SCALE DEVICE FOR USE IN JUDGING DISCOLORATION, FADING OR STAINING

[76] Inventors: Nagaichi Suga, 2-8, 1-chome, Toyama, Shinjuku-ku, Tokyo; Kiyoshi Chaki, c/o Suga Test Instruments Co., Ltd., 4-14, Shinjuku 5-chome, Shinjuku-ku, Tokyo, both of Japan

[21] Appl. No.: 845,686

[22] Filed: Mar. 28, 1986

[30] Foreign Application Priority Data

Mar. 29, 1985 [JP] Japan .................. 60-66235

[51] Int. Cl.$^4$ .............................. G01J 3/52
[52] U.S. Cl. ................................. 356/421
[58] Field of Search ............... 356/421, 422, 423, 435; 434/98

[56] References Cited

PUBLICATIONS

International Standard ISO 105/A, Ref. No. ISO 105/A—1978 (E), pp. i–5.

ISO 105/A—1984 (E), A02 Grey Scale, pp. 7–8.
ISO 105/A—1984 (E), A03 Grey Scale, pp. 9–10.
AATCC Technical Manual, vol. 59, 1984, pp. 137–142.

Primary Examiner—F. L. Evans
Attorney, Agent, or Firm—Wenderoth, Lind & Ponack

[57] ABSTRACT

A scale device for use in judging the amount of discoloration or fading, or for judging the amount of staining, of a sample after a test of the sample for light fastness of dyeing or resistance to staining. The scale device has a plurality of scales of the same color having a plurality of patches with one portion of each patch having the same luminous reflectance and the other portions of the respective patches having successively varied luminous reflectances so as to give to the patches progressive values of color difference. The luminous reflectance of the one portions of the patches of each scale are different from the luminous reflectances of the one patches of the other scales. Four of the scales are arranged in a rhombic arrangement and the remainder of the scales are in a cross shape within the rhombic arrangement.

5 Claims, 4 Drawing Figures

RHOMBIC-SHAPED SCALE DEVICE FOR USE IN JUDGING DISCOLORATION, FADING OR STAINING

This invention relates to a rhombic color scale used for visually judging the amount of discoloration and/or fading of a sample, or the staining of a white cloth which is the result of a test of the fastness of the color of a dye.

BACKGROUND OF THE INVENTION AND THE PRIOR ART

Fastness of the color of a dye is tested by using a blue scale (blue standard dyed cloth) for dyed objects, painted articles, colored plastics, colored sashes, etc., and for measuring discoloration and fading of a sample as a result of said testing for fastness. The tested sample has been judged visually using a grey scale as specified in JIS L 0804 for discoloration and fading.

Also for measuring the degree of staining, such as fastness of color when subjected to washing, etc., the tested sample has been visually judged by using a grey scale specified in JIS L 0805.

This method of visually measuring the degree of discoloration and fading or the degree of staining of a sample by using a grey scale has been adopted internationally by such organizations as ISO, AATCC, ASTM, DIN, and BS, and this grey scale is specified as an international scale standard.

The conventional grey scale for measuring color fastness is not colored. It is constituted as shown in FIG. 3, with the first patch of each pair having a luminous reflectance value Y of 12% plus or minus a small deviation, and the second patch of each pair having the same or a successively higher value, as shown in FIG. 3.

The patches in the grey scale have differences in values of color E of 0, 1.5, 3, 6, and 12 respectively.

The grey scale for measuring the degree of staining is also not colored, similar to the grey scale for discoloration and fading. It is constituted as shown in FIG. 4, with the one patches having a luminous reflectance value Y of 85% and the other patches having differences in the values of color E of 0, 4, 8, 16, and 32 respectively.

The technical materials regarding the grey scales have included JIS L 0804 Grey Scale for Discoloration and Fading, JIS L 0805 Grey Scale for staining, JIS L 0841 Method of Testing Fastness of Dyeing against daylight, ISO 105-A02 Grey Scale for Assessing Change in Color, ISO 105-A03 Grey Scale for Assessing Staining, etc.

However, there are problems in the use of these scales.

Colored products, such as dyed articles, painted objects, colored plastics, colored sashes, etc. have various Y values ranging from a bright color to a dark color.

The conventional measurement of samples of those objects for discoloration and fading has been visually judged by comparing such samples having a plurality of pairs of patches, one of each pair having only one grey scale with a Y value of 12%, regardless of the color of the sample. The judgement is difficult and it takes time to make such a judgement, and there have been disadvantages such as low accuracy of the judgements.

In the judgement of the degree of staining, there have been problems similar to those in the measurement of discoloration and fading, and furthermore not only is staining of white fabric by washing or sweat a problem, but also staining of cloth of light and bright colors is a problem, and judgement of the degree of such staining depends on only one grey scale having a Y value of 85%. The judgement of the degree of staining have resulted in problems similar to those involved in the judgement of discoloration and fading.

For example in measuring discoloration and fading of a sample with a Y of 35%, the sample is compared with one dark grey scale with a Y of 12%, and the person who makes the judgement may doubt his judgement, he may require a long time to reach judgement, and also he may make a wrong judgement.

In order to make the judgement quick and precise, it is by all means necessary to avoid human error, and for this purpose it is necessary to determine if there is a difference in the visual acuity of the persons who make such judgements.

However, with the conventional grey scale it has not been possible to determine the visual acuity of the persons who make the judgements.

OBJECTS AND BRIEF SUMMARY OF THE INVENTION

An object of the present invention is to solve the problem described above and to make the judgements of the degree of discoloration and fading or staining easier and highly accurate.

Still another object of the invention is to determine whether or not there is a difference in the visual acuity of persons who make the judgements.

The present invention employs the following means to solve the above described problems.

In visually judging the degree of discoloration and fading in a sample after it has been tested for fastness of the dye or the degree of staining of a sample of a white coth, etc., the grey scale used as a criterion for discoloration and fading for has luminous reflectance values of 12–45% and the one used as a criterion for staining has luminous reflectance values of 50–85%, and certain of the scales with specified color differences values are arranged in a rhombic shape, and other scales are arranged within the rhombic shape in the form of a cross, and said scales are grey or various colors.

DETAILED DESCRIPTION OF THE INVENTION

Figure 1:
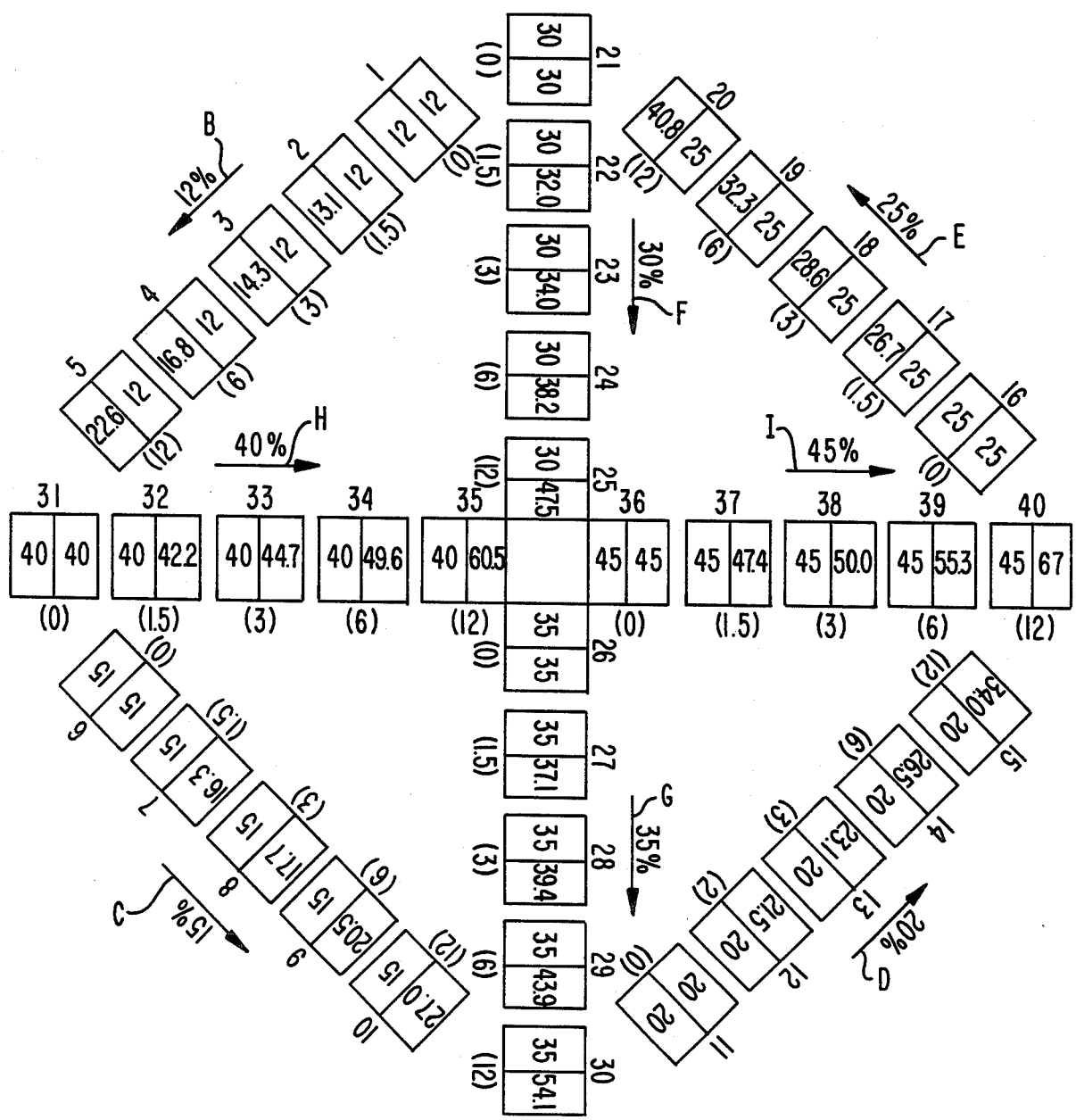
FIG. 1 is a diagram showing a rhombic scale device for use in visually judging discoloration and fading of samples and Y values for the scales in the device.

Firstly, in FIG. 1, scales B–E are deployed in a rhombic shape and scales F–I in a cross shape within the rhombic shape, the scales being grey scales for testing for discoloration and fading or color scales, the scales B–I together constituting a scale device for testing for fastness. This scale device is constituted by a total of eight scales. The first patches of scale B each have a first portion with a value of luminous reflectance Y of 12%, those of the scale C a value of 15%, those of scale D a value of 20%, those of scale E a value of 25%, those of scale F a value of 30%, those of scale G a value of 35%, those of scale H a value of 40% and those of scale I a value of 45%. The second portion of each patch have luminous reflectance values such that the differences in the color values E between portion of the pairs are respectfully 0, 1.5, 3, 6 and 12 for each of the scales. The specific values of luminous reflectance for the second portions in each scale are shown in Table I.

The eight scales are in a rhombic shaped quadrilateral which has the scales B–E along the four sides to form the rhombic shape and the four other scales F–I in a cross shape within said quadrilateral. They are mounted on a substrate (not shown) for easy handling.

The eight scales that form the rhombic and cross shapes are deployed systematically in order to make judgement easier.

Namely, scales B, C, D and E having the first patch portions with values of luminous reflectance Y of 12%, 15%, and 25%, respectively are arranged along the four sides in the recited order, and scales F and H having the first patch portions with values of luminous reflectance Y of 30% and 35% are arranged vertically in a line within the quadrilateral, and scales H and I having the first patch portions with values of luminous reflectance Y of 40% and 45% are placed horizontally in a line within the quadrilateral. In use, for example, the edges of the rhombic-shaped quadrilateral are successively placed along side the sample to be judged beginning with scale B.

Figure 2:
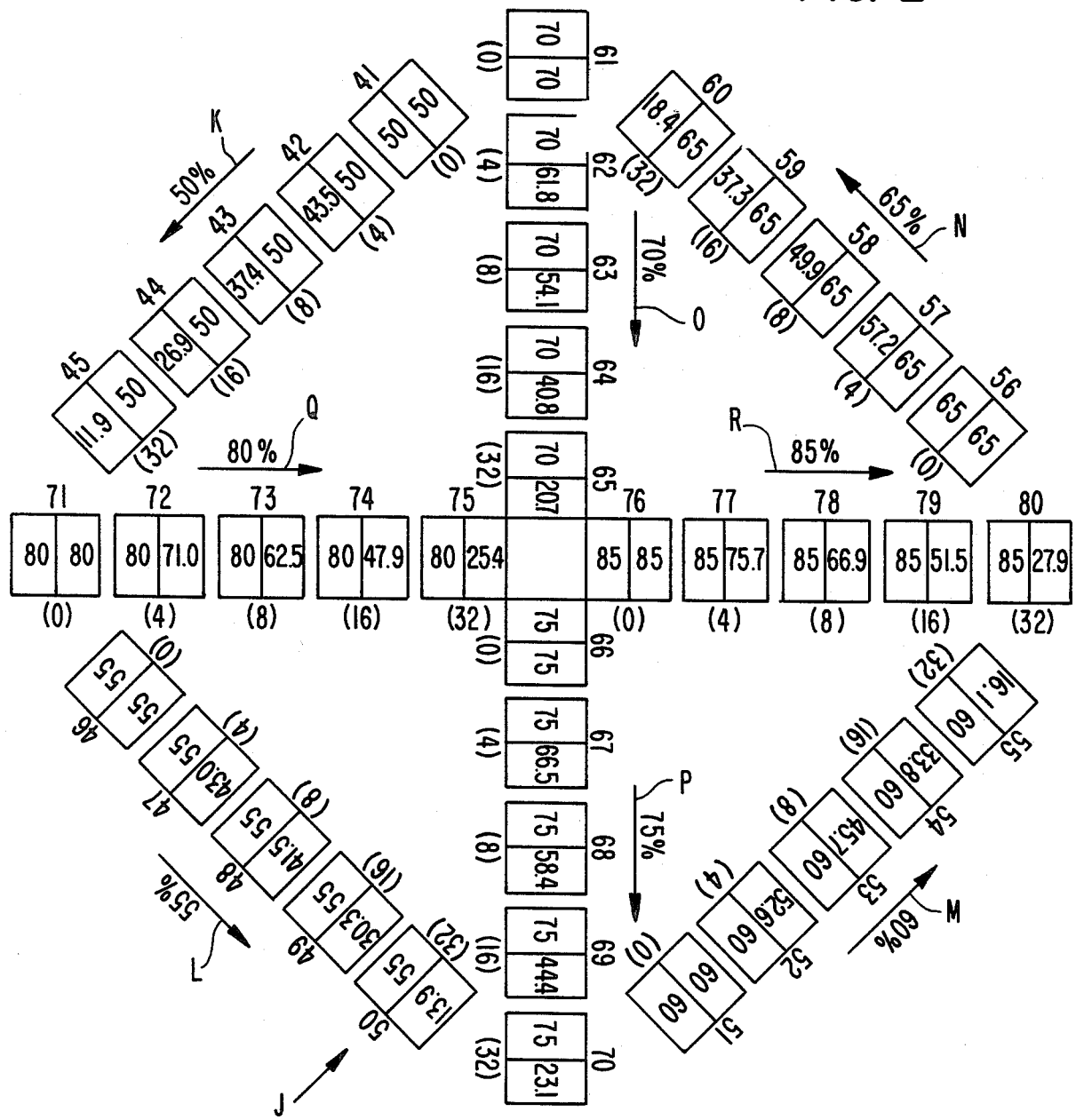
FIG. 2 is a diagram showing a rhombic scale device for use in visually judging staining of samples and the Y values for the scales in the device.
Figure 3:
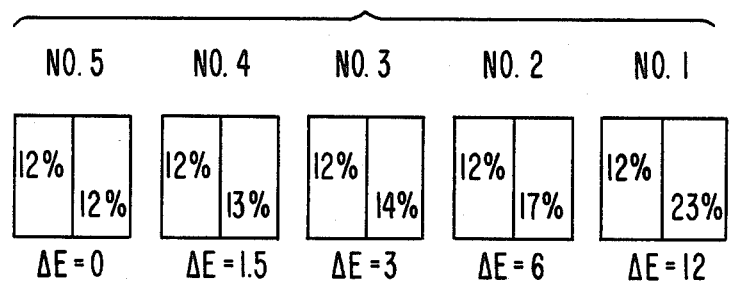
FIG. 3, is a diagram of a conventional grey scale for use in measuring color fastness.
Figure 4:
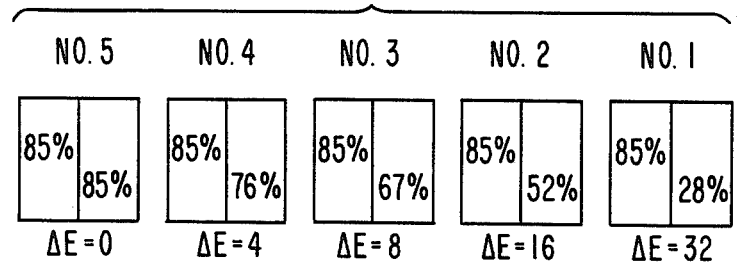
FIG. 4 is a diagram of a conventional grey scale for use in judging staining of samples.

FIG. 2 shows a rhombic shape scale device for judging staining which can have grey scales or color scales. This scale device consists of a scale K having patches with first portions with a value of luminous reflectance Y of 50%, a scale L having first patch portions with a value of Y of 55%, a scale M having first patch portions with a value of Y of 60%, a scale N having first patch portions with a value of Y of 65%, a scale O having first patch portions with a value of Y of 70%, a scale P having first patch portions with a value of Y of 75%, a scale Q having first patch portions with a value of Y of 80% and a scale R having first patch portions with a value of Y of 85%. The second portions of the pairs in each scale patch having luminous reflectance values such that the differences in the color values ΔE between the portions of the pairs are respectively 0, 4, 8, 16 and 32 for each of the scales. The specific values of luminous reflectance for the second patch portions in each scale are shown in Table II.

The eight scales are arranged, similarly to said scale device for judging discoloration and fading, in a rhombic shaped quadrilateral, which has the four scales K–N along the four sides to form the rhombic shape, and the other four scales O–R arranged within the quadrilateral in a cross-shaped arrangement.

TABLE I

| SCALE | COLOR DIP NO. | VALUES OF LUMINOUS REFLECTANCE | | | | |
|---|---|---|---|---|---|---|
| | | 5 | 4 | 3 | 2 | 1 |
| B | 1 ∫ 5 | 12.0 | 13.1 | 14.3 | 16.8 | 22.6 |
| C | 6 ∫ 10 | 15.0 | 16.3 | 17.7 | 20.5 | 27.0 |
| D | 11 ∫ 15 | 20.0 | 21.5 | 23.1 | 26.5 | 34.0 |
| E | 16 ∫ 20 | 25.0 | 26.7 | 28.6 | 32.3 | 40.8 |
| F | 21 ∫ 25 | 30.0 | 32.0 | 34.0 | 38.2 | 47.5 |
| G | 26 ∫ 30 | 35.0 | 37.1 | 39.4 | 43.9 | 54.1 |
| H | 31 ∫ 35 | 40.0 | 42.2 | 44.7 | 49.6 | 60.5 |
| I | 36 ∫ 40 | 45.0 | 47.4 | 50.0 | 55.3 | 67.0 |
| COLOR DIFFERENCE VALUE (ΔE) | | 0 | 1.5 | 3 | 6 | 12 |

TABLE II

| SCALE | COLOR DIP NO. | VALUES OF LUMINOUS REFLECTANCE | | | | |
|---|---|---|---|---|---|---|
| | | 5 | 4 | 3 | 2 | 1 |
| K | 41 ∫ 45 | 50.0 | 43.5 | 37.4 | 26.9 | 11.9 |
| L | 46 ∫ 50 | 55.0 | 48.0 | 41.5 | 30.3 | 13.9 |
| M | 51 ∫ 55 | 60.0 | 52.6 | 45.7 | 33.8 | 16.1 |
| N | 56 ∫ 60 | 65.0 | 57.2 | 49.9 | 37.3 | 18.4 |
| O | 61 ∫ 65 | 70.0 | 61.8 | 54.1 | 40.8 | 20.7 |
| P | 66 ∫ 70 | 75.0 | 66.5 | 58.4 | 44.4 | 23.1 |
| Q | 71 ∫ 75 | 80.0 | 71.0 | 62.5 | 47.9 | 25.4 |
| R | 76 ∫ 80 | 85.0 | 75.7 | 66.9 | 51.5 | 27.9 |
| COLOR DIFFERENCE VALUE (ΔE) | | 0 | 4 | 8 | 16 | 32 |

The eight scales which form the rhombic and cross shapes are systematically deployed to make judgement easier.

Namely, scales K to N having the first patch portions with values of luminous reflectance Y from 50% to 65% are arranged along the four sides of the quadrilateral, and then scales O and P having first patch portions with values of luminous reflectance Y of 70% and 75% respectively are arranged vertically in a line within the quadrilateral, and scales Q and R having first patch portions with values of luminous reflectance Y of 80% and 85% respectively are placed horizontally in a line within the quadrilateral.

In said scale devices, the scales on the diametrically opposite sides of the rhombic arrangement have values of Y which differ by about 10%.

In the use of the present invention which has the construction as above disclosed, the discoloration and fading judging rhombic scale device of FIG. 1 is used in visually judging the degree of discoloration and fading which have occurred in a sample since it was last tested for fastness of color of dyeing.

For instance, if a sample which is to be judged for discoloration or fading is judged visually to have a value of Y of 15%, the sample is juxtaposed with the second scale C on the discoloration and fading rhombic scale device, and the exact value of degree of discoloration or fading is judged by using such scale C.

The same procedure as said procedure for judging discoloration and fading is used for judgement of the degree of staining of a white cloth, except the staining judging rhombic scale of FIG. 2 is used.

In this case also the scale device of FIG. 2 is successively juxtaposed with various samples for judgement and a scale that has Y values that are similar to the Y values of the sample is matched to it.

Further, in both scale devices, i.e. that for judging discoloration and fading and that for judging staining, when two scales that are spaced apart and face each other across the scale device are compared, the contrast of the brightness of the scale that is farther away appears to be reduced depending on the degree of visual acuity of the observer.

For instance, when the scale C having a value of Y of 15% which is nearer to the observer and the scale E having a value of Y of 25% which is on the opposite side of the scale device for discoloration and fading from scale C are observed alternately, a phenomenon occurs in which both appear to have the same color difference to some observers.

Between those to whom both said scales seem the same and those to whom it is difficult for both to appear the same there is a difference in visual acuity, and the rhombic scale devices according to the invention can be used to determine whether two persons who make judgements have different visual acuity.

The scale device shown in FIG. 1 is a grey scale device for judging discoloration and fading.

The scales B, C, D and E with the values of luminous reflectance from 12% to 25% are in counterclockwise order around the four sides of the rhombus.

It will be seen that the scales are systematically arranged according to the size of the Y value from the one with the smallest Y value to the one with the largest Y value.

With this arrangement of the scales, judgement can easily be made by rotating the rhombic scale device so that the scales successively pass by or over the sample and the efficiency and accuracy of judgement are both improved at the same time.

When, for instance, a sample to be judged for discoloration or fading is judged visually to have about 15% as a Y value, it is convenient to use this scale for selecting a desired value that corresponds macroscopically.

The rhombic scale device of FIG. 1 for judging discoloration and fading has scales, as described above, which are arranged successively from the one with the smallest Y value to the one with the largest Y value, but this order of arrangement can be reversed to start from the scale with the largest Y value and go down successively to the one with the smallest Y value, or the order can be clockwise.

A rhombic scale device such as the device of FIG. 1 is provided for each color; for instance for judging grey, grey here being considered to be a color, the scales range from brighter grey to darker grey, and for judging yellow the scales of the scale device cover yellow from a brighter to a darker yellow, and in the same way for other colors.

Table I shows the % values of the luminous reflectance Y of the individual second portion in each patch in said scale, and for each portion its Y % is shown and its color difference is also indicated.

The scales K, L, M and N with Y values from 50% to 60% are arranged in clockwise order around the four sides of the quadrilateral.

The scales are systematically arranged in the direction of the arrow mark in FIG. 2 from the patch with the smallest Y value to the one with the largest Y value successively. This scale device is used the same as that of FIG. 1.

A rhombic scale device for judging staining such as the device of FIG. 2 is made for each color, and the one for grey the scale covers the range from a brighter grey to a darker grey, and the one for yellow covers the range from a brighter yellow to a darker yellow, and in the same way for other colors.

Table II shows the % values of the reflectance Y of the individual second portions in each patch in the scale, and for each portion its Y % is shown and the color difference is also shown.

Next the results of a test for comparison of the times required for judgements and the results of such judgements, using the conventional grey scale and the rhombic scale devices according to the invention, is shown in Table III and Table IV.

TABLE III

Examples of judgement of discoloration and fading

| Sample | Person who judged | Conventional grey scale Time | Class | Rhombic scale device of invention Time | Class |
|---|---|---|---|---|---|
| Y = 36% dyed object | A | 4 min | 4 | 1 min | 3–4 |
| | B | 3 min | 3–4 | 30 sec | 3–4 |
| | C | 4 min | 3–4 | 1 min | 3–4 |
| Y = 17% dyed object | A | 5 min | 4–5 | 1.5 min | 4 |
| | B | 3 min | 4 | 1 min | 4 |
| | C | 4 min | 3–4 | 45 sec | 4 |

TABLE IV

Example of judgement of staining

| Sample | Person who judged | Conventional grey scale Time | Class | Rhombic scale device of invention Time | Class |
|---|---|---|---|---|---|
| Y = 72% attached color cloth | D | 4 min | 2 | 1 min | 3 |
| | E | 6 min | 2–3 | 1.5 min | 3 |
| | F | 5 min | 3–4 | 1 min | 3 |
| Y = 84% attached color cloth | D | 3 min | 3–4 | 30 sec | 3–4 |
| | E | 4 min | 3 | 1 min | 3–4 |
| | F | 3 min | 4 | 45 sec | 3–4 |

As can be seen clearly in those test results, the time required for judgement by the conventional grey scale is reduced to ¼ to 1/5 when the rhombic scale device according to the invention is used.

The error in accuracy of judgement with the conventional scale, that is, the scatter in the judgements by three standard observers, ranged from 1 class to 1.5 class.

The scatter with the scale device according to the invention was zero, that is, all persons judged the same.

The rhombic scale according to the invention has the advantages that, since a sample with discoloration or fading or with staining is compared with a scale which has the same brightness of color as the sample, judgement is quick, easy and accurate.

Further, in the past even for a colored sample one grey scale was used for judgement, but by using the rhombic color scale device of the invention, judgement becomes easier and not only does the efficiency of judgement increase, but also the results of judgement having higher accuracy.

Further, the rhombic scale device according to the invention can also be used to test the visual acuity of the person who makes judgements, and by selecting persons of the same visual acuity for judgement, scatter in the results of judgements can be eliminated, that is, more accurate judgements can be obtained.

What is claimed is:

1. A scale device for use in judging the amount of disoloration or fading, or for judging the amount of staining, of a sample after a test of the sample for light fastness of dyeing or resistance to staining, said scale device comprising:
    a plurality of scales of the same color, each scale having a plurality of patches with first and second portions, the first portion of each patch having the same luminous reflectance and the second portion of the respective patches having successively varied luminous reflectances so as to give to the patches progresive values of color differences, the luminous reflectance of the first portion of the patches of each scale being different from the luminous reflectances of the first portion of the patches of the other scales, four of said scales being arranged in a rhombic arranged and the remainder of said scales being in a cross shaped within said rhombic arrangement.

2. A scale device as claimed in claim 1 in which the luminous reflectances of the first portion of the patches in the scales in the rhombic arrangement increase successively in a direction around the arrangement.

3. A scale device as claimed in claim 2 in which the scale device is for judging discoloration and fading and has the luminous reflectances of said first partion in the range of from 12% to 45%.

4. A scale device as claimed in claim 2 in which the scale device is for judging staining and has the luminous reflectances of said first portion in the range of from 50% to 85%.

5. A scale device as claimed in claim 1 in which the luminous reflectances of the first portion of the patches of the scale along one side of the rhombic arrangement differs from the luminous reflectane of the first portion of the patches of the scale on the diametrically opposite side of the rhombic arrangement by about 10%.

* * * * *